United States Patent [19]

Rupp

[11] Patent Number: 5,615,582
[45] Date of Patent: Apr. 1, 1997

[54] RACK-AND-PINION STEERING GEAR, IN PARTICULAR FOR MOTOR VEHICLES

[75] Inventor: Arthur Rupp, Huttlingen, Germany

[73] Assignee: ZF Friedrichshafen AG, Friedrichshafen, Germany

[21] Appl. No.: 495,656

[22] PCT Filed: Jan. 22, 1994

[86] PCT No.: PCT/EP94/00166
§ 371 Date: Jul. 27, 1995
§ 102(e) Date: Jul. 27, 1995

[87] PCT Pub. No.: WO94/16931
PCT Pub. Date: Aug. 4, 1994

[30] Foreign Application Priority Data

Jan. 28, 1993 [DE] Germany .......................... 43 02 309.6

[51] Int. Cl.⁶ .............................. B62D 3/12; F16B 21/18
[52] U.S. Cl. .................................. 74/498; 74/422
[58] Field of Search ................ 74/498, 422; 180/400, 180/427, 428; 267/159, 161, 163

[56] References Cited

U.S. PATENT DOCUMENTS

| | | | |
|---|---|---|---|
| 1,988,345 | 1/1935 | Vaughn | 267/159 |
| 2,236,206 | 3/1941 | Becker | 267/159 |
| 3,325,755 | 6/1967 | Peek et al. | 267/163 |
| 3,777,589 | 12/1973 | Adams | 74/498 |
| 4,215,591 | 8/1980 | Bishop | 74/422 |
| 4,619,155 | 10/1986 | Futaba | 74/498 |
| 4,680,981 | 7/1987 | Downing | 74/422 |
| 4,815,329 | 3/1989 | Ansgar et al. | 74/422 |

*Primary Examiner*—Charles A. Marmor
*Assistant Examiner*—Troy Grabow
*Attorney, Agent, or Firm*—Larson & Taylor

[57] ABSTRACT

A rack-and-pinion steering gear which includes a steering shaft provided with a driving pinion that engages a rack which is arranged laterally with respect to the steering shaft and which rack is capable of axial movement. A stop formed by a snap ring anchored in a borehole of the steering housing in combination with a supporting part retained by the snap ring supports a thrust piece which is pressed by a spring element against the back of the rack, is guided in the housing borehole and serves to guide the rack in a bedding of the thrust piece. The rack-and-pinion steering gear is further characterized by the supporting part for the spring element or the thrust piece being formed by at least one inwardly directed bar which is firmly connected to the snap ring and which lies in the same plane as the snap ring. In this manner, an elastically yielding thrust piece support which requires less parts and is simple to install is provided in order to render the rack-and-pinion steering gear of the invention suitable for large scale production for use in smaller passenger cars.

7 Claims, 2 Drawing Sheets

1

RACK-AND-PINION STEERING GEAR, IN PARTICULAR FOR MOTOR VEHICLES

BACKGROUND OF THE INVENTION

1. Field of the Invention

This invention relates to a rack-and-pinion steering gear, in particular for motor vehicles.

In such steering gears, the steering shaft bears a driving pinion that engages a rack which is arranged laterally with respect to the steering shaft and which is movable axially. To support the rack and to press into the driving pinion, there is provided a thrust piece that is retained in a housing borehole and that rests against the back of the rack by virtue of spring force. The thrust piece is supported via a stop in the housing. As stop, there is provided a snap ring, anchored in a housing borehole, and a supporting part, retained against said ring.

2. Description of the Prior Art

In a steering gear known from EP A 0 124 418, a disc lies as supporting part on the snap ring and, supported against the disc, there is a spring that keeps the thrust piece resting against the rack without clattering. This kind of thrust piece support has a very simple structure but, to adjust the play, one must measure both the thickness of the snap ring and the thickness of the disc. In addition, there is the fact that the disc must be mounted and must be held during the assembly of the snap ring.

The object of the invention is to find a reasonably priced and elastically yielding thrust piece support that will require less parts and that will use parts that are simple to install. Such a design should be suitable particularly for the large-series production of rack-and-pinion steering gears to be used in smaller passenger cars.

SUMMARY OF THE INVENTION

The support of the thrust piece according to the invention has, as a supporting part, at least one bar that is firmly connected with the snap ring and that is aimed toward the center of the thrust piece. This bar replaces the disc that is now present in the state of the art. If one makes the bar sufficiently stiff, then a spring element—for pressing the thrust piece on—can be supported on the bar. In this case, one therefore needs only two parts for the thrust piece support: the snap ring and one spring. One can also make the bar—which is connected to the snap ring—elastically. The bar then directly supports the thrust piece and at the same time acts as a spring element. One thus needs only a single part for the thrust piece support. The snap ring is anchored in a groove of the thrust piece housing borehole. The play of the thrust piece can be adjusted easily by means of the selective assembly of snap rings having different thicknesses.

In one particular embodiment, a circular plate is molded as bar in the center of the snap ring; said bar is connected to the snap ring by a constriction. The bar lies in the same plane as the snap ring a serves as supporting plate either for the spring element or for the thrust piece. The bearing is simpler and the production costs are lower because one only needs one part when the thrust piece is supported directly.

The supporting part can also be made with bars that extend in star fashion toward the snap ring and that rest on projections of the snap ring. One of the bars is attached to one projection. This design is suitable for supporting the thrust piece by means of a spring element.

According to another embodiment, one can provide on the snap ring equally spaced and inward-protruding bars on which the spring element rests. The snap rings with the inside-located spring supports can be made cheaply by means of precision stamping and subsequent hardening.

Finally, the invention also comprises another embodiment with a spring element integrated into the snap ring. For this purpose, there is provided a bar that is molded upon the snap ring and that extends into the center of the snap ring. Depending on the required spring stiffness, the bar can be made with lesser thickness than the snap ring or with the same thickness as the snap ring. The bar rests on a nose of the thrust piece and presses said piece into the rack. One can therefore eliminate a separate spring element.

The invention is described below in greater detail with the help of four exemplary embodiments illustrated in the drawings.

DETAILED DESCRIPTION OF THE PREFERRED EMBODIMENTS

Figure 2:
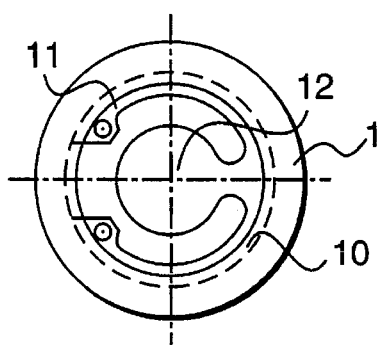
FIG. 2 is a view in the direction of arrow II in FIG. 1 with the housing lid omitted.

A driving pinion 2—positioned in a steering housing 1 and capable of being rotated by a steering wheel—engages a rack 3. Rack 3 and housing 1 surrounding it is not illustrated with its entire length on both sides of the driving pinion for reasons of simplicity. On the side opposite driving pinion 2, a thrust piece 6—loaded by a spring element 5—is guided in a housing borehole 4. Thrust piece 6 has a bedding 7 that is adapted to rack 3 and that is lined with a plastic insert 8. According to the invention, thrust piece 6 rests against a snap ring 11 that is inserted in a groove 10 of housing borehole 4. As one can see from FIG. 2, snap ring 11 has a molded—on support plate 12 against which spring element 5 is supported. To compensate for the play, one can insert snap rings 11 of different thickness (gradation 0.05 mm) in groove 10. In other words, during assembly, one selects a snap ring 11 that is coordinated for the particular production tolerance. For better absorption of its axial movements, one can insert a sealing ring in thrust piece 6. Housing borehole 4 is closed off by a lid 14.

Figure 1:
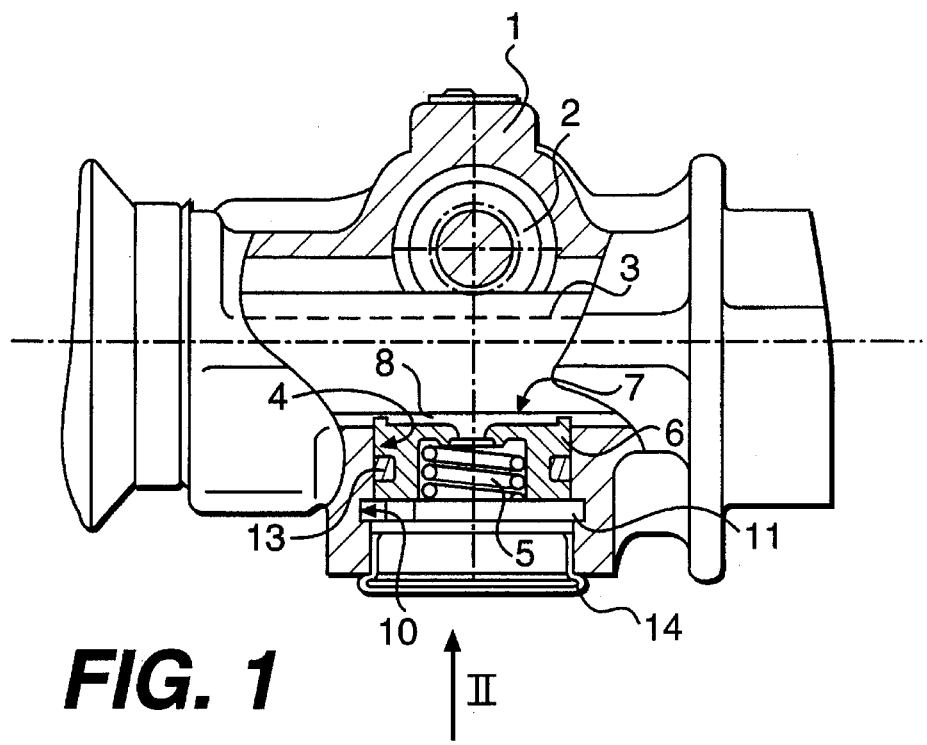
FIG. 1 is partial longitudinal profile through a rack-and-pinion steering gear.
Figure 3:
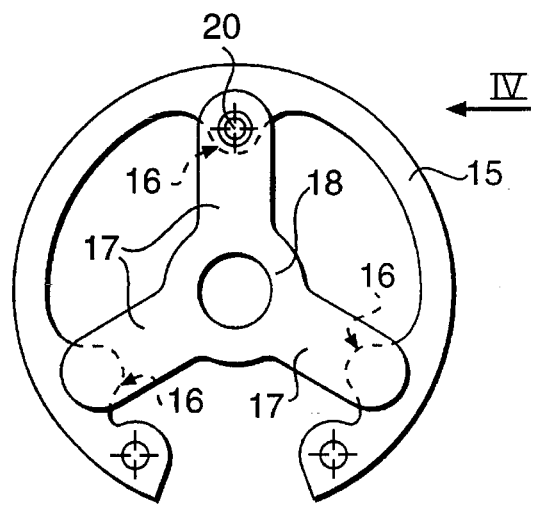
FIG. 3 is an enlarged view of a variant of the snap ring including the supporting plate.
Figure 4:
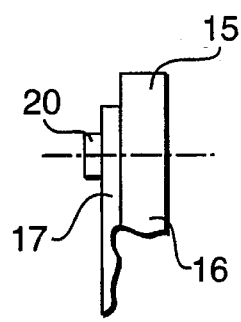
FIG. 4 is a partial view in the direction of arrow IV in FIG. 3.

FIGS. 3 and 4 show a modified snap ring 15 that has projections 16. Projections 16 serve as supporting surfaces for bars 17 of a star-shaped supporting plate 18 that also serves to support a spring element 6 (FIG. 1).

Supporting plate 18 is best attached to one of bars 17 on snap ring 15 by a rivet 20 or the like.

Figure 5:
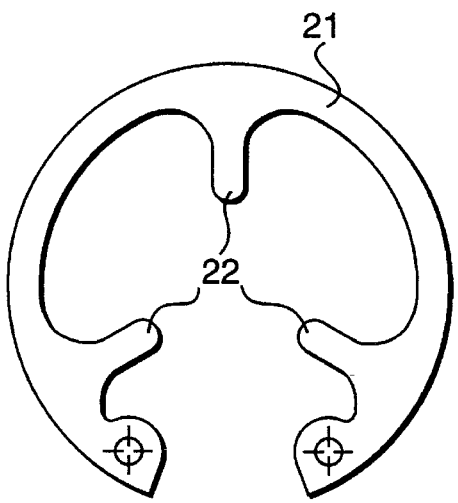
FIG. 5 is an enlarged view of another variant of the invention.

A snap ring 21 according to FIG. 5 has equally spaced, inward-pointed bars 22 to support the spring element.

Figure 6:
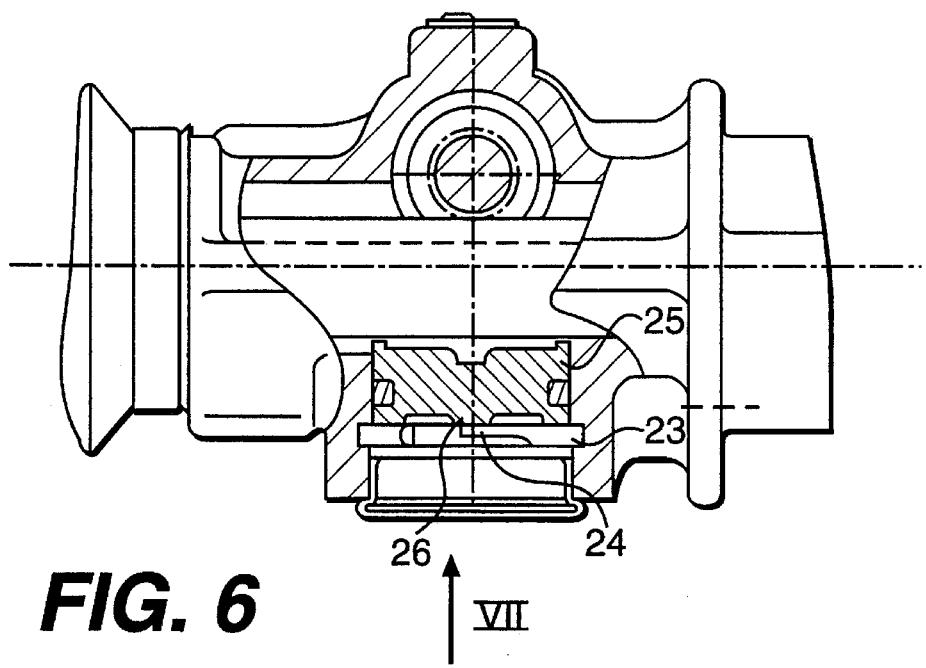
FIG. 6 is a profile along FIG. 1 of another variant.
Figure 7:
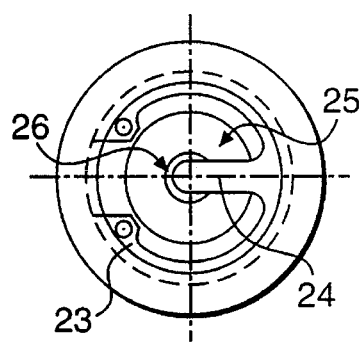
FIG. 7 is a view in the direction of arrow VII in FIG. 6 with the housing lid omitted.

In FIGS. 6 and 7, a spring element is integrated into a snap ring 23. Snap ring 23 has a molded-on bar 24 as spring element; said bar extends into the center of the ring. To achieve adequate elasticity, bar 24 can have a smaller thickness than snap ring 23. Bar 24 acts as a bending spring. Thrust piece 25 has a nose 26 that is located in the middle and bar 24 rests on said nose in a prestressed manner.

We claim:

1. A rack-and-pinion steering gear suitable for use in motor vehicles which comprises:

a steering housing having a borehole therein;

a steering shaft provided with a driving pinion that engages a rack having a back and which is arranged laterally with respect to the steering shaft and which rack is capable of axial movement;

a stop formed by a snap ring anchored in the housing borehole in combination with a supporting part retained by the snap ring;

said rack is guided in a bedding of a thrust piece located in the steering housing;

the thrust piece is pressed by a spring element against the back of the rack, is guided in the housing borehole in the steering housing and rests on the stop;

wherein the supporting part for the spring element or the thrust piece is formed by at least one inwardly directed bar which is firmly connected to the snap ring and which bar lies in the same plane as the snap ring.

2. A rack-and-pinion steering gear as claimed in claim 1 wherein the bar comprises a substantially circular plate that is integral with the snap ring and the bar is connected to the snap ring by a constriction.

3. A rack-and-pinion steering gear as claimed in claim 1 wherein the housing borehole is provided with a groove and snap rings of different thickness can be inserted in the groove to compensate for play in the groove.

4. A rack-and-pinion steering gear as claimed in claim 1 wherein the snap ring is provided with a plurality of projections;

the supporting part is provided with bars that extend in a star-shape towards the snap ring and rest on the projections of the snap ring; and wherein one of the bars is attached to a projection.

5. A rack-and-pinion steering gear as claimed in claim 4 wherein the bar is attached to the projection by a rivet.

6. A rack-and-pinion steering gear as claimed in claim 1 wherein the supporting part of the snap ring includes several evenly spaced bars which protrude inwardly.

7. A rack-and-pinion steering gear as claimed in claim 1 wherein the bar is molded on the snap ring and extends into the center of the snap ring, and the bar rests elastically against a nose that is formed in the middle of the thrust piece.

* * * * *